United States Patent
Vorbrüggen et al.

[11] 3,891,623
[45] June 24, 1975

[54] PROCESS FOR PREPARING CYTIDINES

[75] Inventors: Helmut Vorbrüggen; Ulrich Niedballa, both of Berlin, Germany

[73] Assignee: Schering Aktiengesellschaft, Berlin, Germany

[22] Filed: May 3, 1972

[21] Appl. No.: 250,045

[30] Foreign Application Priority Data
May 4, 1971 Germany.......................... 2122991

[52] U.S. Cl............................................ 260/211.5 R
[51] Int. Cl............................................. C07d 51/52
[58] Field of Search............................. 260/211.5 R

[56] References Cited
UNITED STATES PATENTS

| | | | |
|---|---|---|---|
| 3,328,388 | 6/1967 | Shen et al | 260/211.5 R |
| 3,328,389 | 6/1967 | Shimizu et al. | 260/211.5 R |
| 3,346,561 | 10/1967 | Boxer et al | 260/211.5 R |
| 3,354,160 | 11/1967 | Duschinsky et al. | 260/211.5 R |
| 3,404,144 | 10/1968 | Fox et al. | 260/211.5 R |
| 3,522,237 | 7/1970 | Chernetsky et al | 260/211.5 R |
| 3,708,469 | 1/1973 | Vorbrüggen et al. | 260/211.5 R |
| 3,721,664 | 3/1973 | Hoffer | 260/211.5 R |

*Primary Examiner*—Johnnie R. Brown
*Attorney, Agent, or Firm*—Millen, Raptes & White

[57] ABSTRACT

Cytidines of the formula

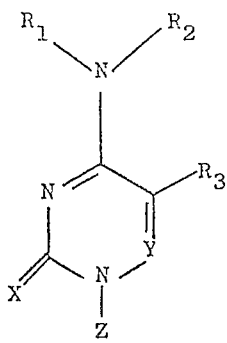

wherein the $R_1R_2N-$ is a primary, secondary or tertiary amino group; $R_3$ is hydrogen, halogen or lower alkyl of 1 to 6 carbon atoms; X is oxygen or sulfur; Y is nitrogen or CH; and Z is a free or blocked sugar residue having cytotoxic, anti-viral, enzyme-inhibiting, immuno-suppressive, anti-inflammatory, anti-psoriatic, anti-leucaemic and anti-bacterial activity are produced from the corresponding 4-trialkylsilyloxyuridines by reaction with ammonia or a primary or secondary amine followed, if desired, by removal of blocking groups on the sugar residue.

24 Claims, No Drawings

PROCESS FOR PREPARING CYTIDINES

BACKGROUND OF THE INVENTION

1. Field of the Invention

This invention relates to an improved process for the preparation of cytidine and cytidine derivatives.

2. Description of the Prior Art

Cytidines are important antimetabolites and due to their advantageous biological properties, e.g., enzyme-inhibiting, immuno-suppressive anti-inflammatory, anti-psoriatic, anti-leucaemic and anti-bacterial. Cytidines having a free or blocked ribofuranosyl residue are known in the art and have been described in Collection Czechoslov. Chem. Commun. 30, 2052 (1965). Cytidines are generally produced from the readily obtainable uridines in accordance with the method of Fox et al. described in J. Am. Chem. Soc. 81, 178 (1959). In this method, the free hydroxy groups of the sugar residue must first be acylated. The masked uridines must then be converted, with phosphorus pentasulfide in pyridine, into the 4-thio-derivatives. These thio-derivatives are reacted either as such or after conversion into the corresponding 4-thioethers with ammonia or primary or secondary amines to form the corresponding cytidines. Due to the large number of required reaction stages, the process is expensive, wasteful and cumbersome.

OBJECTS OF THE INVENTION

It is accordingly an object of this invention to provide an improved process for preparing cytidines.

Another object of this invention is to provide new cytidine derivatives having enzyme-inhibiting, immuno-suppressive, anti-inflammatory, anti-psoriatic and anti-bacterial activities.

A further object of the this invention is to provide pharmaceutical compositions containing novel cytidine derivatives as an active agent.

Other objects of this invention will become apparent to those skilled in the art from the following discussion of the invention.

SUMMARY OF THE INVENTION

In one aspect of this invention, cytidines of the Formula I

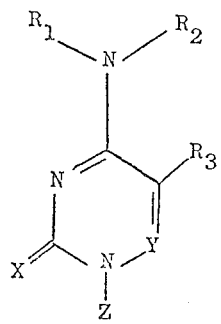

wherein $R_1$ and $R_2$ are both hydrogen or alkyl of 1 to 6 carbon atoms; or $R_1$ is hydrogen and $R_2$ is hydroxyl, amino, alkyl of 1 to 6 carbon atoms; aryl or aralkyl unsubstituted or substituted with hydroxyl or amino, aminoalkyl N-substituted with alkyl of 1 to 4 carbon atoms; or $R_1$ and $R_2$, together with the N-atom, collectively represent a heteromonocyclic ring of 4–7 members containing a total of 1–3 hetero atoms which, in addition to the nitrogen atom, can be nitrogen, oxygen, or sulfur; $R_3$ is hydrogen, halogen, or alkyl of 1 to 6 carbon atoms; X is oxygen or sulfur; Y is nitrogen or CH; and Z is a free or blocked sugar residue, are prepared by reacting a 4-trialkylsilyloxyuridine derivative of Formula II

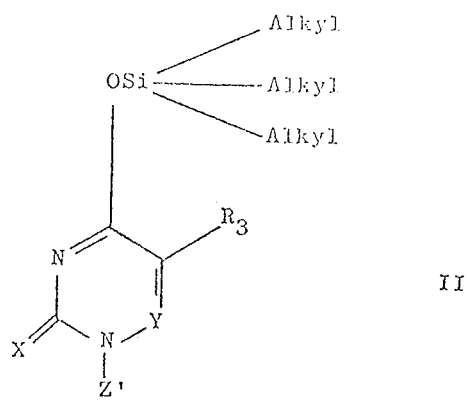

wherein Alkyl is alkyl of 1 to 3 carbon atoms, preferably methyl, Z' is a silylated or acylated sugar residue, and $R_3$, X, and Y have the above-indicated meanings, with ammonia or a primary or secondary amine of the formula $HNR_1R_2$, or with a salt of a primary or secondary amine in the presence of a tertiary amine, and thereafter optionally hydrolyzing the blocking groups on the sugar residue.

DETAILED DISCUSSION

It has now been found that uridines silylated in the 4-position can be reacted directly with ammonia or amines to form corresponding cytidines. In this reaction, it makes no difference whether the sugar residue in the uridine is in the free or blocked form, since any free hydroxy groups in the sugar residue are likewise silylated, and the silyl groups can be easily split off again after the reaction.

The 4-trialkylsilyloxyuridines of Formula II used in the process of this invention are known in the art and can be prepared, for example, by the method described in the U.S. Pat. Spec. No. 1,118,269.

Particularly suitable as blocking groups are the trimethylsilyl groups, because they can be readily removed. The starting compounds silylated on the sugar residue, as set forth in Formula II, are obtained, e.g., by reacting free uridines with hexamethyldisilazane (HMDS) in the presence of trimethylchlorosilane or ammonium salts and optionally in the presence of a tertiary base, such as pyridine. In this case, the 4-trimethylsilyloxy group and the blocking groups are introduced simultaneously.

For purposes of the reaction according to the present invention, it is unnecessary to isolate the starting compounds of Formula II. The 4-trialkylsilyloxyuridine, formed in situ, can be reacted directly with ammonia or an amine in the reaction solution to form the corresponding cytidine.

Thus, for example, the intermediate product of Formula II, formed in the $N_1$-glycosidation of 2,4-bis(trimethylsilyl)ated uracils, instead of being reacted with water to form the uridine, can be reacted with a compound $HNR_1R_2$ to form the cytidine directly. The details of the reaction depend on the nature of the compound $HNR_1R_2$, as described herein. The treatment of the silyl compound of Formula II with primary or secondary amines is generally conducted at −20°C. to 180°C., preferably at 20° to 120°C. When using a primary or secondary amine in the salt form, the procedure is effected in the presence of a tertiary amine.

Suitable primary amines include but are not limited to methylamine, ethylamine, propylamine, butylamine, benzylamine, 2-(3,4-dihydroxyphenyl)-ethyl-amine, homoveratrylamine, N,N-dimethylethylenediamine, and phenthylamine. Preferred primary amines are butylamine, benzylamine and phenethylamine.

Suitable secondary amines include but are not limited to dimethylamine, diethylamine, pyrrolidine, piperidine, morpholine and hexamethyleneimine. Preferred secondary amines are diethylamine, pyrrolidine, piperidine and morpholine.

Suitable tertiary amines include but are not limited to trimethylamine, triethylamine, ethyldiisopropylamine, pyridine and quinoline. Preferred tertiary amines are triethylamine and ethyldiisopropylamine.

The tertiary amine is generally used in an amount ranging from 1 to 5 mole, preferably 1 to 2 mole per mole of primary or secondary amine salt.

Since primary amines will react directly with the silylating agent, the primary amine must be added after the formation of the silyl compound of Formula II.

The reaction with ammonia is conducted under elevated pressure of about 20–50 atmospheres gauge; generally with an $NH_3$ partial pressure of 1 to 30 atmospheres gauge. After about 20–80 hours at 0–180° C., the reaction can be terminated. When silylating with hexamethyldisilazane, free ammonia is liberated and the silylation and reaction with ammonia can be conducted in a single stage.

In contrast to the primary amines, the secondary amines exhibit very low reactivity with the silylating agent. Therefore, the silylating agent and the secondary amine can be added simultaneously.

The reaction can take place with an inert solvent, e.g., dioxane, tetrahydrofuran, dimethylformamide, benzene, toluene, chloroform, glycol dimethylether, diethylenglycol-dimethylether, N-methylpyrrolidine, pyridine and triethylamine.

The reaction can be conducted at room temperature or at higher or lower temperatures, e.g., −20–150° C. Generally, the reactants are employed in approximately equimolar amounts. However, it is generally advantageous to employ the amine in a molar excess in order to obtain as quantitative as possible conversion of the 4-trialkylsilyloxyuridine.

Examples of

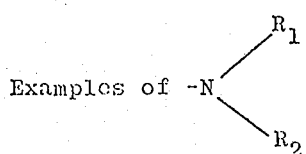

are dimethylamino, methylethylamino, diethylamino, methyl-n-propylamino, dipropylamino, diisopropylamino, methylisobutylamino, di-n-butylamino, pyrrolidino, 2-methylpyrrolidino, 2,5-dimethylpyrrolidino, 3-ethylpyrrolidino, piperidino, homopiperidino, morpholino, imidazole, triazole, piperazine, indalyl and anilino, N-lower-alkylanilino, benzylamino, N-lower-alkyl-benzylamino, o-toluidino, p-toluidino or N-lower-alkyl-phenylethylamino.

Examples of Z are ribose, 2-deoxyribose, glucose, arabinose, aldose, fructose, galactose, galactosamine, mannose, rhamnose, sorbose, xylose, an glucosamine, especially ribose, deoxyribose, arabinose and glucose.

The hydroxy groups of the sugar residue can be free or blocked, such as by being O-silylated or O-acylated, as is well-known in the art. Suitable sugar blocking groups are the hydrolyzable blocking groups conventionally employed in sugar chemistry, which include but are not limited to ester and ether groups, e.g., acetyl and other alkanoyl groups; benzoyl and other aroyl groups, e.g., p-chlorobenzoyl, p-nitrobenzoyl, and p-toluyl, and cleavable ether groups, e.g., a benzyl group.

Compounds which can be prepared according to the process of this invention, in addition to those shown in the Examples, include:

1-($\beta$-D-glucofuranosyl)-2-oxo-4-pyrrolidino-1,2-dihydro-1,3-diazine; 1-($\beta$-D-arabinofuranosyl)-2-oxo-4-pyrrolidino-1,2-dihydro-1,3-diazine; 2-(2,3,4 arabinopyranosyl)-3-thio-5-pyrrolidino-2,3-dihydro-1,2,4,-triazino; 1-($\beta$-D-ribofuransoyl)-2-oxo-4-piperidino-1,2-dihydro-1,3-diazine.

Other such compounds of this invention are:

2-(2,3,4,6-Tetra-O-acetyl-$\beta$-D-glucopyranosyl)-3-thio-5-pyrrolidino-2,3-dihydro-1,2,4-triazine.

1-($\beta$-D-Ribofuranosyl)-2-oxo-4-pyrrolidino-1,2-dihydro-1,3-diazine.

1-($\beta$-D-Ribofuranosyl)-2-oxo-4-[2-(3,4-dihydroxyphenyl)-ethylamino]-1,2-dihydro-1,3-diazine.

1-($\beta$-D-Ribofuranosyl)-2-oxo-4-[2-(N,N-dimethylamino)ethylamino]-1,2-diazine.

2-(2,3,5-Tri-O-benzoyl-$\beta$D-Ribofuranosyl)-3-oxo-5-benzylamino-2,3-dihydro-1,2,4-triazine.

2-(2,3,5-Tri-O-benzoyl-$\beta$-D-Ribofuranosyl)-3-oxo-5-pyrrolidino-2,3-dihydro-1,2,4-triazine.

2-(2,3,4,6-Tetra-O-acetyl-$\beta$-D-glucopyranosyl)-3-thio-5-[(2-phenyl)ethylamino]-2,3-dihydro-1,2,4-triazine.

The compounds of this invention can be employed in the same manner as the known compounds 1-$\beta$-arabinofuranosylcytosine [J. Med. Chem. 15, 116 (1972)] and 1-$\beta$-D-ribofuranosyl-5-fluorocytosine (U.S. Pat. No. 3,002,965).

The compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves or creams, which are, if desired, sterilized, or mixed with auxiliary agents, such as preservatives, stabilizers, or wetting agents, or salts for influencing the osmotic pressure, or with buffer substances.

The substances of this invention is generally administered to animals, including, but not limited to, mammals and avians, e.g., cattle, cats, dogs, and poultry.

A daily dosage comprises about 100 to 10,000 mg. active compound of this invention on oral administration and a 5 % greasy ointment on topical administration. In general, the mg/kg ratio is preferably about 1 to 100 mg. per kg. of body weight. The dose can be administered once per day or in increments throughout the day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

1-($\beta$-D-Ribofuranosyl)-2-oxo-4-amino-1,2-dihydro-1,3-diazine

In an autoclave, 4.88 g. of uridine (20 millimols), 50 ml. of HMDS, and 5 mg. of ammonium chloride were agitated, after saturation with ammonia, at an interval temperature of 162° C. and under 27 atmospheres gauge for 18 hours. After cooling, the reaction mixture was once more saturated (30 minutes) with ammonia at room temperature, and the agitation was continued for another 54 hours at 162° C./27 atm. gauge. After cooling, the substance was extracted with methanol. The solvent was removed under vacuum. The residue was taken up in 400 ml. of methanol and refluxed for 6 hours. The solution was concentrated to dryness under vacuum; the remaining substance was dissolved in 100 ml. of water and treated with activated carbon. Upon concentration under vacuum, there remained 3.9 g. of an almost colorless, amorphous residue. The substance was crystallized from moist ethanol in the form of colorless needles.

Yield: 3.42 g. (70.2% of theory); m.p. 230° C. (under decomposition).

EXAMPLE 2

1-($\beta$-D-Ribofuranosyl)-2-oxo-4-pyrrolidino-1,2-dihydro-1,3-diazine

In a mixture of 50 ml. of absolute pyridine, 10 ml. of HMDS, and 0.1 ml. of trimethylchlorosilane, 5 g. of uridine (20.5 millimols) was suspended and refluxed for 5 hours at a bath temperature of 140° C.; during this step, the uridine was dissolved. The solvent was withdrawn under vacuum, the residue was mixed with 5 ml. of absolute pyrrolidine (60.7 mmol) and refluxed for another 20 hours. Then, the mixture was cooled and the solvent eliminated under vacuum. Residues of pyrrolidine were removed by codistillation with benzene. The brownish oil was dissolved in methanol and clarified with activated carbon. After removing the methanol, the remainder was heated for 45 minutes to 80° C. with 80% acetic acid. The acetic acid was removed under vacuum, and the residue was crystallized from ethanol.

Yield: 4.52 g. (74.3% of theory); m.p. 209–211° C.

EXAMPLE 3

1-($\beta$-D-Ribofuranosyl)-2-oxo-4-morpholino-1,2-dihydro-1,3-diazine

In a mixture of 50 ml. of absolute pyridine, 15 ml. of HMDS, and 0.5 ml. of trimethylchlorosilane, 5 g. of uridine (20.5 mmol) was suspended and refluxed at a bath temperature of 140° C.; during this step, the uridine was dissolved. After adding 5 ml. of absolute morpholine (57.4 mmol), the mixture was refluxed another 60 hours. The thin-layer chromatogram showed only traces of the starting material. The solvent was eliminated under vacuum, and remainders of morpholine were removed by co-distillation with toluene. The residue, a brown oil, was heated for 30 minutes at 80° C. with 80% strength acetic acid. Then, the acetic acid was withdrawn under vacuum. The remainder was dissolved in methanol, clarified with activated carbon, and subjected to column chromatography on silica gel. The product was obtained as a yellowish foam.

Yield: 3.1 g. (46.3% of theory);
$C_{13}H_{19}N_3O_6$ (313.21)

|  | C | H | N |
|---|---|---|---|
| Calculated: | 49.83 | 6.11 | 13.41 % |
| Found: | 49.59 | 6.24 | 13.29 % |

EXAMPLE 4

1($\beta$-D-Ribofuranosyl)-2-oxo-4-[2-(3,4-dihydroxyphenyl)-ethylamino]-1,2-dihydro-1,3-diazine.

In a mixture of 25 ml. of absolute pyridine, 80 ml. of HMDS, and 0.5 ml. of trimethylchlorosilane, 5 g. of uridine (20.5 mmol) was suspended and refluxed at a bath temperature of 140° C. and was thus dissolved. After the entire amount of uridine had been dissolved (1 hour), it was heated for another 30 minutes. Then, 3.9 g. of dopamine hydrochloride (20.5 mmol) was added; this substance was dissolved after 30 minutes. Under further heating, 3.64 ml. of "Hünig" base (22 mmol) was added, while a dry $N_2$ stream bubbled through the solution. The solution became gradually darker. After refluxing for 43 hours, the thin-layer chromatogram revealed that a more polar compound had been formed. The solvent was removed under vacuum, residues of pyridine were removed by codistillation with toluene. The remainder was heated with 80% acetic acid to 80° C. for 30 minutes. The acetic acid was removed by means of an oil pump. The residue was subjected to column chromatography on silica gel. The product was obtained as a yellowish foam.

Yield: 2.8 g. (34.8% of theory). $C_{17}H_{21}N_3O_7$ (379.36)

|  | C | H | N |
|---|---|---|---|
| Calculated: | 53.82 | 5.58 | 11.08 % |
| Found: | 53.57 | 5.73 | 10.99 % |

EXAMPLE 5

1-($\beta$-D-Ribofuranosyl)-2-oxo-4-[2-(N,N-dimethylamino)-ethylamino]-1,2-dihydro-1,3-diazine 5 g. of uridine (20.5 mmol) was suspended in 100 ml. of HMDS. After the addition of 0.1 ml. of trimethylchlorosilane, the reaction mixture was heated under reflux for 16 hours, thus causing the uridine to dissolve. The excess HMDS was removed by a water-jet aspirator at 110° C. The remainder was mixed with 5 ml. of absolute N,N-dimethylethylenediamine (56 mmol) and agitated at 120°C. for 65 hours. After cooling, the solution was mixed with 50 ml. of 80% strength acetic acid and stirred for 17 hours at room temperature. Then, the mixture was concentrated to dryness under vacuum. Residual acetic acid was removed by codistillation with ethanol. The dark-brown residue was subjected to column chromatography on silica gel with methanol as the eluent. The product, a yellow foam, was crystallized from ethanol.

Yield: 4.0 g. (62% of theory); m.p. 184°–185° C.

EXAMPLE 6

1-(2-Desoxy-$\beta$-D-ribofuranosyl)-2-oxo-4-benzylamino-5-methyl-1,2-dihydro-1,3-diazine In 30 ml. of HMDS, 2.42 g. of thymidine (10 mmol) and 10 mg. of ammonium chloride were suspended and refluxed for 18 hours. The excess HMDS was distilled off. The residue was mixed with 1.63 ml. of absolute benzylamine (15 mmol), and the mixture was stirred for 72 hours at room temperature. Then, the solvent was removed under vacuum. Any remaining benzylamine was eliminated by codistillation with ethanol. The residue was taken up in aqueous methanol and treated with activated carbon. Upon concentration under vacuum, a yellowish foam remained.

Yield: 1.92 g. (58.2% of theory). $C_{17}H_{21}N_3O_4$ (331.36)

|  | C | H | N |
|---|---|---|---|
| Calculated: | 61.62 | 6.39 | 12.68 % |
| Found: | 61.33 | 6.52 | 12.59 % |

EXAMPLE 7

1-(2-Desoxy-$\beta$-D-ribofuranosyl)-2-oxo-4amino-5-methyl-1,2-dihydro-1,3-diazine In an autoclave, 1.21 g. of thymidine (5 mmol), 20 ml. of HMDS, and 5 mg. of ammonium chloride were agitated, after saturation with ammonia, at an internal temperature of 162° C. and under 27 atmospheres gauge for 16 hours. After cooling to room temperature, the mixture was again saturated with ammonia (30 minutes), and the agitation was continued for another 54 hours at 155° C./27 atm. gauge. After cooling, the substance was flushed out with methanol. The solvent was removed under vacuum. The dark-brown residue was taken up in 150 ml. of methanol and refluxed for 6 hours. After concentration under vacuum, the mixture was taken up in water and treated with activated carbon. Upon concentration under vacuum, a yellowish residue remained which was crystallized from absolute ethanol.

Yield: 0.663 g. (55% of theory); m.p. 195° C. (hydrate).

EXAMPLE 8

2-(2,3,4,6-Tetra-O-acetyl-$\beta$-D-glucopyranosyl)-3-thio-5-[(2-phenyl)-ethylamino]-2,3-dihydro-1,2,4-triazine 2.29 g. of 1-(tetra-O-acetyl-$\beta$-D-glucopyranosyl)-2-thio-6-azauracil (5 mmol), 3 ml. of HMDS, and 0.1 ml. of trimethylchlorosilane were dissolved in 100 ml. of absolute benzene and refluxed for 3 hours. After cooling to room temperature, the solution was mixed with 1.26 ml. of 2-phenylethylamine (10 mmol). A colorless, crystalline precipitate was thus obtained. After agitation at room temperature for 72 hours, the solvent was removed under vacuum. The residue was crystallized from ethyl acetate.

Yield: 2.25 g. (84% of theory); m.p. 212° C.

EXAMPLE 9

2-(2,3,4,6-Tetra-O-acetyl-$\beta$-D-glucopyranosyl)-3-thio-5-pyrrolidino-2,3-dihydro-1,2,4-triazine 2.29 g. of 1-(tetra-O-acetyl-$\beta$-D-glucopyranosyl)-2-thio-6-azauracil (5 mmol), 3 ml. of HMDS, and 0.1 ml. of trimethylchlorosilane were dissolved in 100 ml. of absolute benzene and refluxed for 3 hours. After cooling to room temperature, the solution was mixed with 0.83 ml. of absolute pyrrolidine (10 mmol) and agitated at room temperature for 72 hours. Then, the solvent was removed under vacuum. The residue was crystallized from methanol.

Yield: 2.12 g. (83% of theory); m.p. 160–162° C.

EXAMPLE 10

2-(2,3,5-Tri-O-benzoyl-$\beta$-D-ribofuranosyl)-3-oxo-5-benzylamino-2,3-dihydro-1,2,4-triazine 3.0 g. of 6-azauridine tribenzoate (5.38 mmol) was dissolved in 100 ml. of absolute benzene. After adding 3 ml. of HMDS, as well as 0.1 ml. of trimethylchlorosilane, the mixture was refluxed for 3 hours. After cooling to 70° C. (bath temperature), 1 ml. of absolute benzylamine (10 mmol) was added thereto, and the mixture was agitated for 65 hours at room temperature. The solvent was removed under vacuum, and remaining benzylamine was removed by codistillation with benzene. The product was crystallized from isopropanol.

Yield: 2.2 g. (63% of theory); m.p. 178–179° C.

EXAMPLE 11

2-(2,3,5-Tri-O-benzoyl-$\beta$-D-ribofuranosyl)-3-oxo-5-pyrrolidino-2,3-dihydro-1,2,4-triazine 3.0 g. of 6-azauridine tribenzoate (5.38 mmol), 3 ml. of HMDS, and 0.1 ml. of trimethylchlorosilane were dissolved in 100 ml. of absolute benzene. The solution was refluxed for 3 hours. Then, 1.0 ml. of absolute pyrrolidine (12.2 mmol) was added thereto, and the mixture was stirred at room temperature for 15 hours. The solvent was removed under vacuum, and the residue was crystallized from ethanol.

Yield: 3.0 g. (91.5% of theory); m.p. 186–187° C.

EXAMPLE 12

2-(2,3,5-Tri-O-benzoyl-$\beta$-D-ribofuranosyl)-3-oxo-5-pyrrolidino-2,3-dihydro-1,2,4-triazine 2.57 g. of the 2,4-bis(trimethylsilyl) compound of 6-azauracil (10 mmol) and 4.8 g. of 2,3,5-tri-O-benzoylribofuranosyl chloride (10 mmol) were dissolved in 200 ml. of absolute benzene. The solution was cooled to 10° C. and then 2.0 g. of dried silver perchlorate (10 mmol), dissolved in 100 ml. of absolute toluene, was added thereto. White silver chloride precipitated. The reaction was terminated by one hour of agitation in a flask under the exclusion of light at room temperature. Under anhydrous conditions, 4.1 ml. of absolute pyrrolidine (43 mmol) was added thereto and the mixture agitated overnight at room temperature. The brown solution was filtered off from the solid substance. The residue was washed with benzene. The combined solutions were washed with sodium thiosulfate solution and with water. After drying over magnesium sulfate, the solvent was removed under vacuum. Residues of pyrrolidine were eliminated by codistillation with toluene. The residue from the evaporation was a brown oil (6.6 g.). The product was crystallized from ethanol.

Yield: 2.8 g. (45.9% of theory); m.p. 186–187° C.

EXAMPLE 13

2-(2,3,5-Tri-O-benzoyl-β-D-ribofuranosyl)-3-oxo-5-pyrrolidino-2,3-dihydro-1,2,4-triazine 5.04 g. of 1-O-acetyl-2,3,5-tri-O-benzoyl-ribofuranose (10 mmol) and 11 mmol of the 2,4-bis(-trimethylsilyl) compound of 6-azauracil were dissolved in 150 ml. of absolute 1,2-dichloroethane. After the addition of 0.84 ml. of tin(IV) chloride (7.6 mmol) in 20 ml. of absolute 1,2-dichloroethane, the mixture was agitated at room temperature for 4 hours. Under the exclusion of moisture, 9.8 ml. of pyrrolidine (120 mmol) was then added. After an initially turbid mixture, a clear solution was obtained. After 3 hours of agitation at room temperature, the yellow solution was extracted with ice water. The organic phase was dried over magnesium sulfate and concentrated under vacuum. Any remaining pyrrolidine was removed by codistillation with toluene. The residue from the evaporation was a brown oil (7.0 g.). The product was crystallized from ethanol.

Yield: 3.5 g. (57.4% of theory); m.p. 186–187° C.

EXAMPLE 14

2-(2,3,5-Tri-O-acetyl-β-D-ribofuranosyl)-3-oxo-5-hydroxylamino-2,3-dihydro-1,2,4-triazine 1.86 g. of 2-(2,3,5-tri-O-acetyl-β-D-ribofuranosyl)-6-azauracil (5 mmol), 3 ml. of HMDS, and 0.1 ml. of trimethylchlorosilane were dissolved in 100 ml. of absolute benzene, and the mixture was refluxed for 3 hours. After cooling to room temperature, the solution was mixed, under agitation, with 15 ml. of absolute THF wherein 10 mmol of absolute hydroxylamine was dissolved. The mixture was stirred for another 72 hours at room temperature and then concentrated to dryness under vacuum. The residue was crystallized from ethanol.

Yield: 1.33 g. (68.8% of theory); m.p. 90–92° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of pharmaceutically useful cytidines of the formula

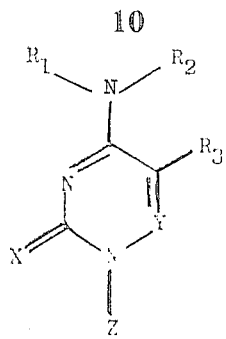

wherein $R_1$ and $R_2$ are both hydrogen or alkyl of 1 to 6 carbon atoms; or $R_1$ is hydrogen and $R_2$ is hydroxyl, amino, alkyl of 1 to 6 carbon atoms, phenyl or phenyl-lower alkyl optionally ring substituted with hydroxyl or amino, or amino alkyl N-substituted with alkyl of 1 to 4 carbon atoms; or $R_1$ and $R_2$, together with the N-atom, collectively represent a heteromonocyclic ring selected from the group consisting of pyrrolidino, 2-methylpyrrolindino, 2,5-dimethylpyrrolindino, 3-ethylpyrrolindino, piperindino, homopiperidino, morpholino, imidazolyl, triazolyl, piperazino, indolyl and anilino; $R_3$ is hydrogen, halogen or alkyl of 1 to 6 carbon atoms; X is oxygen or sulfur; Y is nitrogen or CH; and Z is a free or masked monosaccharide residue, the improvement which comprises reacting a 4-trialkyl-silyloxyuridine derivative of the formula

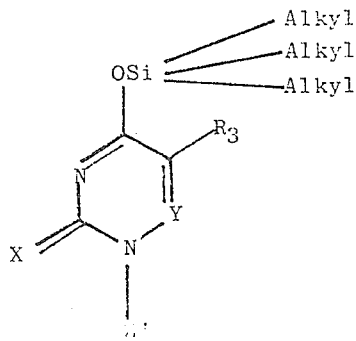

wherein Alkyl is of 1 to 3 carbon atoms, Z' is a hydrolyzable silylated, or hydrolyzable O-acylated masked monosaccharide residue Z, wherein acyl is lower alkanoyl, benzoyl, p-chlorobenzoyl, p-nitrobenzoyl, touyl, or benzyl and $R_3$, X, Y and Z have the above-indicated meanings, with ammonia or with a primary or secondary amine of the formula H N $R_1$ $R_2$, or with a salt of said primary or secondary amine in the presence of 1 to 5 moles of a tertiary amine per mole of amine salt to form said cytidine.

2. A process according to claim 1, wherein $R_1$ and $R_2$ are both hydrogen or alkyl of 1 to 6 carbon atoms.

3. A process according to claim 2, wherein $-N R_1 R_2$ is selected from the group consisting of dimethylamino, methyl-ethylamino, diethylamino, methyl-n-propylamino, dipropylamino, diisopropylamino, methylisobutylamino and di-n-butylamino.

4. A process according to claim 1, wherein $R_1$ is hydrogen.

5. A process according to claim 1, wherein $R_1$ and $R_2$ represent said heteromonocyclic ring.

6. A process according to claim 5, wherein said heteromonocyclic ring is pyrrolidino, morpholino or piperidino.

7. A process according to claim 1, wherein Alkyl is methyl.

8. A process according to claim 1, wherein Z is a masked monosaccharide, further comprising hydrolyzing the masking groups to form the corresponding free sugar.

9. A process according to claim 1, wherein said amine is a primary amine which is added directly to the 4-trialkyl-silyloxyuridine derivative.

10. A process according to claim 9, wherein said primary amine is selected from the group consisting of methylamine, ethylamine, propylamine, butylamine, benzylamine, 2-(3,4-dihydroxyphenyl)-ethyl-amine, homoveratrylamine, N,N-dimethylethylenediamine and phenethylamine.

11. A process according to claim 10, wherein said primary amine is butylamine, benzylamine or phenethylamine.

12. A process according to claim 1, wherein said amine is a secondary amine.

13. A process according to claim 12, wherein said secondary amine is added together with a silylating agent to the 4-trialkyl-silyloxyuridine derivative.

14. A process according to claim 12, wherein said secondary amine is selected from the group consisting of dimethylamine, diethylamine, pyrrolidine, piperidine, morpholine and hexamethyleneimine.

15. A process according to claim 14, wherein said secondary amine is diethylamine, pyrrolidine, piperidine or morpholine.

16. A process according to claim 1, wherein said 4-trialkyl-silyloxyuridine is reacted with a salt of a primary or secondary amine in the presence of said tertiary amine.

17. A process according to claim 16, wherein said tertiary amine is selected from the group consisting of trimethylamine, triethylamine, ethyldiisopropylamine, pyridine and quinoline.

18. A process according to claim 17, wherein said tertiary amine is triethylamine or ethyldiisopropylamine.

19. A process according to claim 1, wherein said 4-trialkyl-silyloxyuridine is reacted with ammonia formed in situ by silylating with hexamethylenedisilazine.

20. A process according to claim 1, wherein X is oxygen.

21. A process according to claim 1, wherein Y is nitrogen.

22. A process according to claim 1, wherein $R_3$ is hydrogen or methyl.

23. A process according to claim 1, wherein Z is a monosaccharide selected from the group consisting of ribose, 2-deoxyribose, glucose, arabinose, aldose, fructose, galactose, galactosamine, mannose, rhamnose, sorbose, xylose and glucosamine.

24. A process according to claim 23, wherein said monosaccharide is ribose, deoxyribose, arabinose or glucose.

* * * * *